United States Patent [19]

Helferich

[11] Patent Number: 4,814,300

[45] Date of Patent: Mar. 21, 1989

[54] POROUS CERAMIC SHAPES, COMPOSITIONS FOR THE PREPARATION THEREOF, AND METHOD FOR PRODUCING SAME

[75] Inventor: Richard L. Helferich, Clayton, Ohio

[73] Assignee: The Duriron Company, Inc., Dayton, Ohio

[21] Appl. No.: 127,942

[22] Filed: Dec. 2, 1987

[51] Int. Cl.$^4$ .................. C04B 35/18; C04B 38/10; C04B 41/53; C04B 41/91

[52] U.S. Cl. .................. 501/84; 501/125; 501/128; 106/75; 106/84; 252/315.5; 423/181; 423/203; 264/42; 264/48; 428/312.4; 428/316.6; 428/318.8; 428/689; 428/697

[58] Field of Search .................. 106/75, 84; 501/84, 501/125, 128; 252/315.5; 423/181, 203; 264/42, 48; 428/312.4, 316.6, 318.3, 689, 697

[56] References Cited

U.S. PATENT DOCUMENTS

| | | | |
|---|---|---|---|
| 1,638,849 | 8/1927 | Haverstick | 106/84 |
| 1,638,888 | 8/1927 | Slepian | 106/84 |
| 1,682,675 | 8/1928 | Horsfield | 264/43 X |
| 1,761,108 | 6/1930 | Desmarquest | 264/43 |
| 1,842,186 | 1/1932 | McBerty | 264/43 |
| 1,880,157 | 9/1932 | Setterberg | 264/43 |
| 2,216,251 | 10/1940 | Quisling | 106/75 |
| 2,322,667 | 6/1943 | Seastore et al. | 106/84 |
| 3,419,495 | 12/1968 | Weldes et al. | 106/84 |
| 3,700,470 | 10/1972 | Barton | 106/75 |
| 3,762,935 | 10/1973 | Leach | 264/43 X |
| 3,855,393 | 12/1974 | Rao | 106/75 |
| 4,059,658 | 11/1977 | Shoup et al. | 264/43 |
| 4,071,369 | 1/1978 | Kurz et al. | 264/43 X |
| 4,133,691 | 1/1979 | Kindt et al. | 106/75 |
| 4,217,240 | 8/1980 | Bergna | 502/263 |
| 4,356,271 | 10/1982 | Francis et al. | 264/43 X |
| 4,357,165 | 11/1982 | Helferich et al. | 106/84 X |
| 4,432,798 | 2/1984 | Helferich et al. | 106/84 |
| 4,574,063 | 3/1986 | Schoer | 264/60 |
| 4,721,696 | 1/1988 | Kidd | 502/263 X |

Primary Examiner—William R. Dixon, Jr.
Attorney, Agent, or Firm—St. Onge Steward Johnston & Reens

[57] ABSTRACT

Disclosed herein is a foamable, self-setting ceramic composition which can be poured into molds or injection-molded or extruded to achieve desired shapes, and thereafter fired to produce shaped, porous ceramic articles useful as filter elements, insulation, kiln furniture, molds furnace linings or other like articles, the composition containing agents capable of developing an aluminosilicate hydrogel and capable of generating gas to produce porosity within the hydrogel bound molded shape.

18 Claims, 5 Drawing Sheets

FIG. 1
PROCESS FLOW DIAGRAM

FIG. 2 REDUCTION IN BROOKFIELD VISCOSITY OF A CERAMIC SLURRY AS A FUNCTION OF SILICA FUME CONTENT AND SPINDLE SPEED

FIG. 3

EFFECT OF SILICA FUME CONTENT ON GREEN MOR STRENGTH OF HIGH DENSITY CAST HYDROGEL SHAPES (2.1 g/cc)

FIG. 4 EFFECT OF PROCESSING VARIABLES ON FOAM PORE SIZE

FIG. 5 EFFECT OF PROCESSING VARIABLES ON FOAM DENSITY

POROUS CERAMIC SHAPES, COMPOSITIONS FOR THE PREPARATION THEREOF, AND METHOD FOR PRODUCING SAME

BACKGROUND OF THE INVENTION

The present invention relates to ceramic articles, and more particularly to porous ceramic shapes, made from compositions which can be cast into molds or injection molded or extruded in desired configuration, which shapes find utility for a wide variety of purposes, including filters, kiln furniture, molds, furnace linings, insulation, and other similar products.

It is known in the art to prepare porous ceramic articles for a number of uses. For example, ceramics possessing open-celled porosity can be employed as filters for removing impurities from molten metals or for removing particulates from gaseous streams or other like filtration uses, while ceramics of open- or closed-cell porosity can find use as insulation or for any other purpose where low density structures are advantageous.

Recent interest in porous ceramics as filtering devices has developed as a consequence of increasingly stringent governmental regulations in the United States and Europe regarding maximum allowable particulates (e.g., soot) in the exhaust from automobile or truck diesel engines. A number of recent patents have suggested use of ceramics as filters for diesel particulates since ceramics generally possess excellent structural and dimensional stability under the high-temperature conditions encountered during filtration of the exhaust and subsequent burn-off (combustion) of the trapped particulates, with the requisite porosity being accomplished by various compositional and processing techniques. Most notable in these efforts has been the utilization of so-called ceramic monolithic honeycomb filtering elements as described, for example, in U.S. Pat. Nos. 4,276,071 and 4,364,761 assigned to General Motors Corp.; U.S. Pat. Nos. 4,329,162; 4,415,344; 4,416,675; 4,416,676; 4,417,908; 4,419,108 and 4,420,316 assigned to Corning Glass; and U.S. Pat. Nos. 4,283,210; 4,293,357; 4,307,198; 4,340,403; and 4,364,760 assigned to NGK Insulators. Essentially, these elements consist of a monolithic ceramic having a multitude of internal parallel chambers separated by thin porous ceramic internal walls, with a number of the chambers being end-sealed so as to force particulate-containing exhaust gas to traverse across a porous wall before exiting the element. Generally, these elements are formed by an extrusion process, and materials are included in the compositions which are burned out during the firing process so as to provide the requisite porosity in the internal filtering surfaces. In another process, as reflected in U.S. Pat. No. 4,363,644 assigned to Nippon Soken, foamed, structural polyurethane systems are utilized in admixture with inorganic materials in processes wherein the polyurethane burns out during firing so as to leave behind a ceramic structure having a variety of interconnected open cells for trapping particulates.

While the structural and dimensional properties of ceramics generally lend themselves well to utilization as the material from which filter elements for diesel traps are constructed, it is not an easy or inexpensive matter to achieve from ceramic materials elements possessing the porosity needed to effectively and efficiently filter soot as well as permit exhaust gas flow without substantial build-up of back pressure. Additionally, efforts toward optimizing the geometry of diesel filter trap designs (so as to facilitate inclusion of the filter in the exhaust area of a vehicle, or to maximize filtration, or to facilitate regeneration or removal of the filter element) can be severely limited by the inability to produce such shapes efficiently (or at all) utilizing ceramics.

These same problems, i.e., difficulty in economic attainment of desired porosity and lack of design flexibility in produceable shapes or configurations, are also present with respect to many other desired uses of porous ceramics besides particulate filters, and constitute significant limitations on the use of porous ceramics for such other possible uses. For example, many filtering applications which require use of filter aids (e.g. diatomaceous earth) could in theory be economized significantly by provision of a porous ceramic as the essential filtering element (i.e., eliminating the need for use of filter aids which are disposed of after each filtration), but efforts in this regard have been hampered by the inability to produce such porous ceramics economically and with sufficient control over porosity and other characteristics. Additionally, strong impetus exists for producing porous ceramics for low-mass applications which do not rely upon potentially hazardous inorganic fibers to provide porosity, but again efforts in this regard have been plagued by lack of economically feasible compositions and processes for making such porous ceramics.

The present invention addresses and overcomes these problems by provision of compositions and processes which enable the manufacture of porous ceramics of any desired size and shape as well as any desired form or extent of porosity. As a consequence, the range of potential uses for porous ceramics is greatly extended.

SUMMARY OF THE INVENTION

According to the present invention, there is described a ceramic composition which is capable of being molded into a desired configuration, and which develops stable porosity as a result of internal reactions and interactions between and among deliberately present elements of the composition. Among the significant advantages of the composition is the ability to manipulate its elements and/or the amounts thereof so as to controllably achieve a wide variety of characteristics in the final ceramic article. The composition is self-setting, again controllably, and in the set state is then further processable (including a firing step) to produce a ceramic article having a porous structure. Porous ceramic articles made from the compositions of the present invention can be arranged to have a predominantly open or a predominantly closed cell network depending upon desired end use. The open-cell configurations are especially useful for the production of filtering elements (such as elements for filtering particulate soot suspended in diesel exhaust gases), while both open and closed-cell configurations exhibit utility as insulation, furnace linings, kiln furniture, molds and the like.

The composition of the present invention has the important characteristic of being moldable into any desired configuration, thereby greatly expanding the potential porous ceramic shapes which are achievable and which may be required for a wide variety of functional and/or aesthetic purposes. Generally, the composition will be poured or cast into a mold of desired configuration or injection-fed into an appropriate mold. However, it also is possible to directly extrude the composition into particular porous shapes.

According to the present invention, there is provided a composition comprised of an admixture of an aluminosilicate hydrogel and suitable refractory ceramic materials, e.g., refractory oxides, carbides, nitrides, borides, silicides and the like, such as alumina, chromia, zirconia, magnesia, titania, silica and mixtures thereof (either as admixtures per se or admixed as part of a compound itself, e.g., mullite, cordierite, calcined kyanite and the like), silicon carbide, silicon nitride, boron carbide, boron nitride, and the like. Also included as part of the composition are a particulate metal, a surfactant system and a gel strengthening agent, these latter ingredients being present in essential yet relatively minor proportions relative to the hydrogel and ceramic components. In addition, refractory fibers may be included in the composition to attain yet additional strength in the eventual molded and fired ceramic.

The foregoing composition is described with reference to generally identifiable constituents of the composition at the time of its molding or extrusion and setting, but the general process of preparing the composition utilizes more fundamental components which, upon admixture, result in the formation of the described hydrogel (i.e., rather than addition of the hydrogel as an identifiable separate ingredient). The hydrogel is formed from a water soluble source of silicate and a water soluble source of aluminate, and the remaining components of the castable composition (e.g., refractory ceramic materials, surfactant, gel strengthening agent, particulate metal, refractory fibers) can be added to or distributed between one or both of the aluminate or silicate compositions. Upon admixture of these two separately prepared and maintained aqueous compositions or slurries, there is formed an aluminosilicate hydrogel which serves to bind together all components of the composition. The hydrogel binder is self-setting at ambient conditions and is capable of setting and binding the composition to a generally self-supporting structure within a brief but controllable time.

According to the present invention, the component parts of the ceramic composition are admixed to form a moldable composition, generally adding the silicate slurry to the aluminate slurry. Mixing is done in this fashion because the aluminate slurry acts to retard the gelation time while the silicate slurry acts as an accelerator. Therefore, if the aluminate slurry is added to the silicate slurry, the possibility exists for a rapid, but partial gelation to occur which would, in effect, result in an incompletely set mix. Before any substantial self-setting of the composition occurs, it is cast or molded or extruded to the desired shape, taking into account, of course, that the composition is intended to foam and expand to attain the final desired configuration. During the self-setting reaction, additional reaction takes place within the composition in which the particulate metal reacts with alkali (e.g. sodium) compounds in the composition to produce, inter alia, hydrogen gas. By arranging the self-setting hydrogel reaction to be of suitable duration, the composition increases in volume as a consequence of the internal gas generation and takes on a porous nature as the gas evolves within and from the composition. Then, as close as possible to the cessation of gas evolution, the in-situ hydrogel formation causes the composition to set in the desired porous molded configuration.

Where the intended ultimate use of the porous ceramic article is in high temperature environments and/or environments involving substantial temperature cycling, it generally is necessary to further treat the self-supporting, molded structure to substantially remove therefrom or therein compounds which would inhibit the thermal shock resistance of the ceramic article, e.g., compounds which lead to formation of glassy phases (e.g., compounds of alkali metals or phosphorus or boron, etc. which might be present as a consequence of the need to employ water-soluble forms of the silicates and aluminates used to form the hydrogel or by virtue of other added components). Such treatment can include removal of such compounds per se and/or alteration of such compounds by ionic exchange. Thereafter, the structure is dried to remove any water therefrom, and is then fired at suitable conditions to result in the ultimately-desired shaped porous ceramic article.

DETAILED DESCRIPTION OF THE INVENTION

The present invention provides a moldable ceramic composition, and thus enables the preparation of final fired ceramics of the shapes and sizes most suitable for any particular end use and for optimized geometric configuration in such end use. Moreover, the nature of the composition permits the eventual ceramic to retain its as-molded condition yet possess porosity making it suitable for a wide variety of end uses requiring such porosity, such as particulate filters, kiln furniture, and the like. In this regard, the composition and process of the invention offer substantial advantages in ease of processing and economics as compared to other known methods for preparing porous ceramics of some defined shape, such as the impregnation of foamed polyurethane or other resinous structures with thixotropic ceramic compositions followed by firing to decompose the carrier foam (see, e.g., British Patent Specification No. 1,596,446 and U.S. Pat. Nos. 3,833,386 and 4,332,753) or other methods known in the art (see, e.g., U.S. Pat. Nos. 3,419,495; 3,466,221; and 3,450,547).

The aluminosilicate hydrogel portion of the composition of the present invention is, in essential respects, as described in commonly-assigned U.S. Pat. Nos. 4,357,165 and 4,432,798, both of which are expressly incorporated herein by reference. As described in those patents, the hydrogel results from the admixture of water soluble sources of both silicate and aluminate (typically, sodium silicate and sodium aluminate), which admixture then self-sets at ambient temperatures in times which can be exceedingly short (e.g., on the order of as little as a few seconds but typically on the order of a few minutes), but nevertheless can be controlled by predetermined choice of molar ratio between aluminate and silicate, concentration of water, and temperature. The ability to exercise control over setting times for the hydrogel binder leads to important advantages with respect to attainment in the present invention of molded ceramic articles of both desired geometry and desired porosity. Also described in the above-noted patents is the utilization of the hydrogel components along with granular refractory particles to produce, e.g., molds, by virtue of the self-setting hydrogel serving to bind the granular materials into a self-supporting structure.

According to the present invention, the separately prepared and admixed components for forming the aluminosilicate hydrogel have added to them and/or distributed between them the remainder of the components which will make up the moldable ceramic composition and the eventual fired porous ceramic shaped article. As earlier noted, the essential elements of this composition, besides the hydrogel-forming constituents, are refractory ceramic materials, particulate metal powder, a gel strengthening agent such as silica fume and a surfactant component, with refractory fibers or other conventional materials optional. The refractory ceramic materials generally will be present in the overall composition in a weight percentage of from about 50% to about 90%, preferably from about 60% to about 70%. In a preferred embodiment of the invention, the ceramic materials included in the composition will be chosen from cordierite, calcined kyanite and mixtures thereof, with most preferred compositions containing nearly equal weight proportions of both cordierite and calcined kyanite, e.g., from about 30 to 35% of each ceramic.

According to the invention, the requisite porosity in the final ceramic article is provided as a consequence of in situ reaction between metal powder and alkali compounds (e.g., sodium hydroxide) present in the moldable composition, resulting in development of hydrogen gas as a reaction by-product. As a consequence of this internal gas production and evolution, the composition will expand in volume in the mold (or during extrusion as the case may be) and develop porosity, the quantity of the composition obviously being regulated to take into account the expected (and predetermined) degree of expansion within the mold or during extrusion to arrive at the desired final density and size of the article. At the same time, the surfactant present in the composition serves to break up the bubbles of evolving gas in the aqueous composition to achieve, controllably, suitably small bubbles and to assure that the porosity developed in the structure will be predominantly of the open-celled type, e.g., as required for filtration uses, or predominantly of the closed-cell type as useful, e.g., for applications where lower thermal conductivity, higher strength, buoyancy or the like is the ultimate criterion.

The preferred particulate metal is aluminum, although other metals or metal alloys such as silicon or ferrosilicon which similarly will react with alkali compounds present in the composition to produce hydrogen gas also can be employed.

For most generalized compositions, the amount of surfactant and metal (e.g. aluminum) powder will be relatively small compared to the other components of the system, with the typical levels of addition of the surfactant being in the range of from about 0.05 to 1.0 percent by weight of the total composition and the metal powder being in the range of from about 0.05 to 0.5 percent by weight of the total composition. Preferred ranges of addition for these materials are 0.4 to 0.8 percent by weight for the surfactant (most preferably about 0.6%) and 0.1 to 0.2 percent by weight for the metal powder (most preferably about 0.15%), and a preferred ratio between the surfactant and metal powder is generally from about 2:1 to 8:1, most preferably about 4:1.

Among the preferred class of surfactants (which may be used alone or in combination) for use in the invention are the silicone glycols such as are available from the Dow Chemical Company for use, e.g., in producing polyurethane foams. These surfactants have a stabilizing effect on the gaseous by-products produced and are available in a variety of customized formulations (based upon the silicone glycol chemistry) that are designed to control bubble (or cell) size as well as to control or dictate whether the cells are mostly open or mostly closed. For example, the surfactants from Dow Chemical known as DC 190, DC 198, Q2 5160 and Q2 5125, provide a mostly open cell structure in the present invention, while other surfactants from Dow Chemical, such as DC 193, DC 197, DC 5103 and DC 5098, provide a mostly closed cell structure in the present invention. In addition, still other Dow Chemical silicone glycol surfactants are available to further customize a foamed cell structure with a controlled or limited amount of cells opened, such as Q2 5243, DC 5043, Q2 5169, X2 5256, X2 5258 and Q2 5244. Although the silicone glycol type surfactants are preferred, a variety of other non-silicone surfactant types also may be employed, such as those available from Air Products & Chemicals, Inc. under tradename LK-221 and LK-443.

With respect to the aluminum or other particulate metal, the average particle size of the powder employed generally will be in the range of from about 1 to 44 $\mu$m, and preferably about 6-9 $\mu$m, with the understanding that the larger the surface area of the metal present in the composition, the more vigorous and extensive will be the foaming reaction.

Another essential ingredient of the composition of the invention is a gel strengthenlng agent, preferably silica fume, although other suitable agents may be employed. Silica fume is a by-product collected in the airstream during the reduction of silica sand by coal or coke in an arc furnace to make metallurical-grade silicon metal. The particulates are hollow spheres, roughly 0.25 micron in diameter, composed of about 96% silica and having a light carbonaceous layer on their surface. Although the mechanism by which silica fume operates in the compositions of the invention is not entirely understood, its addition brings about a number of advantages, such as lowering the viscosity of the composition for a given solids content and reinforcing the gel network (without increasing viscosity) to give greater green strength. Without the presence of the silica fume, the hydrogel bonded aggregate structure appears more prone to cracking during drying operations. By reinforcing the gel structure, the silica fume reduces shrinkage as the molded article is dried. Generally, it has been found that the silica fume is effective at levels of from about 0.25 to about 10 percent by weight of the total composition, preferably from about 1 to 4 percent by weight, and mosr preferably from about 1 to 2% by weight.

As noted, gel strengthening agents other than silica fume can be employed, such as fly ash, manganese oxide fume, ferrosilicon fume and the like. Based upon experimentation to date, the chief characteristic required to be possessed by the gel strengthening agent is the small, spherical shape enabling it to react readily with the matrix binder and/or aggregate constituents.

As earlier noted, the moldable ceramic composition may advantageously further comprise refractory ceramic fibers, such as Kaowoll TM, Fiberfax TM and Fiberkal TM type aluminosilicate fibers, Saffil TM alumina fibers, silicon carbide whiskers and calcium silicate fibers, to give further rigidity to the molded and fired structure. Typically, these fibers can be present in an amount up to as much as about 60 percent by weight of the composition, but most typically are employed in amounts from about 1to 4% by weight.

In the present invention, the components of the ceramic composition are selected to yield a particular setting time (e.g., by variation in aluminate/silicate ratio and/or solids content, and taking into account the temperature at which the composition will be molded), consistent with the anticipated duration of the foaming process in the mold or during extrusion. As noted earlier, a distinct advantage of the invention is that the setting time can be arranged to achieve a particular dimensionally stable degree of gelation at or very near the time when the gassing reaction ceases, thus insuring retention of the developed porosity in the molded and eventually fired article. If gelation occurs too soon, the composition lacks the freedom to develop and accommodate the desired degree of porosity and/or may result in cracking of the set structure as gas continues to be evolved, while if gelation is de ayed too long, the developed porosity will have a tendency to break down before the structure can be firmed up. While this latter problem might be curable by excess utilization of surfactant and/or aluminum, cure in this way may introduce into the article too substantial amounts of components making control more difficult and which may adversely affect final product characteristics.

Figure 1:
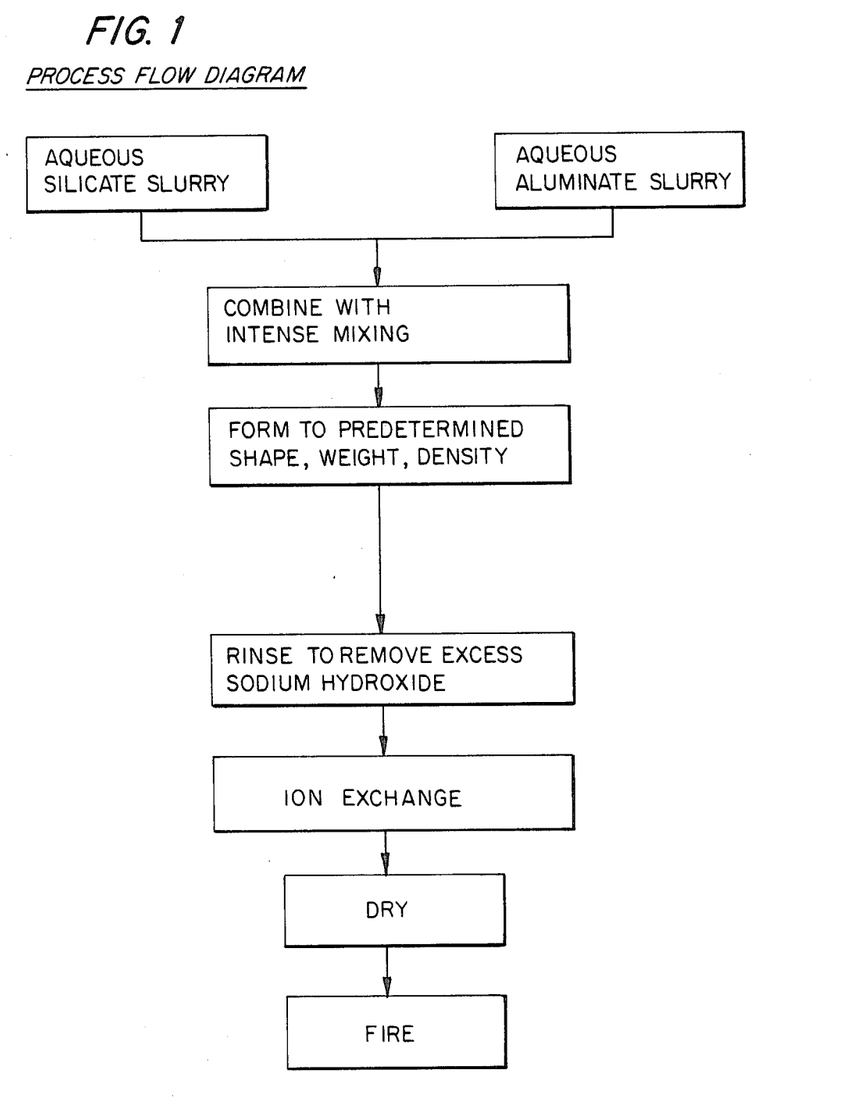
FIG. 1 is a process flow chart illustrating the generalized steps of the process of the present invention for arriving at shaped porous ceramic articles, including certain preferred process and compositional aspects.
Figure 2:
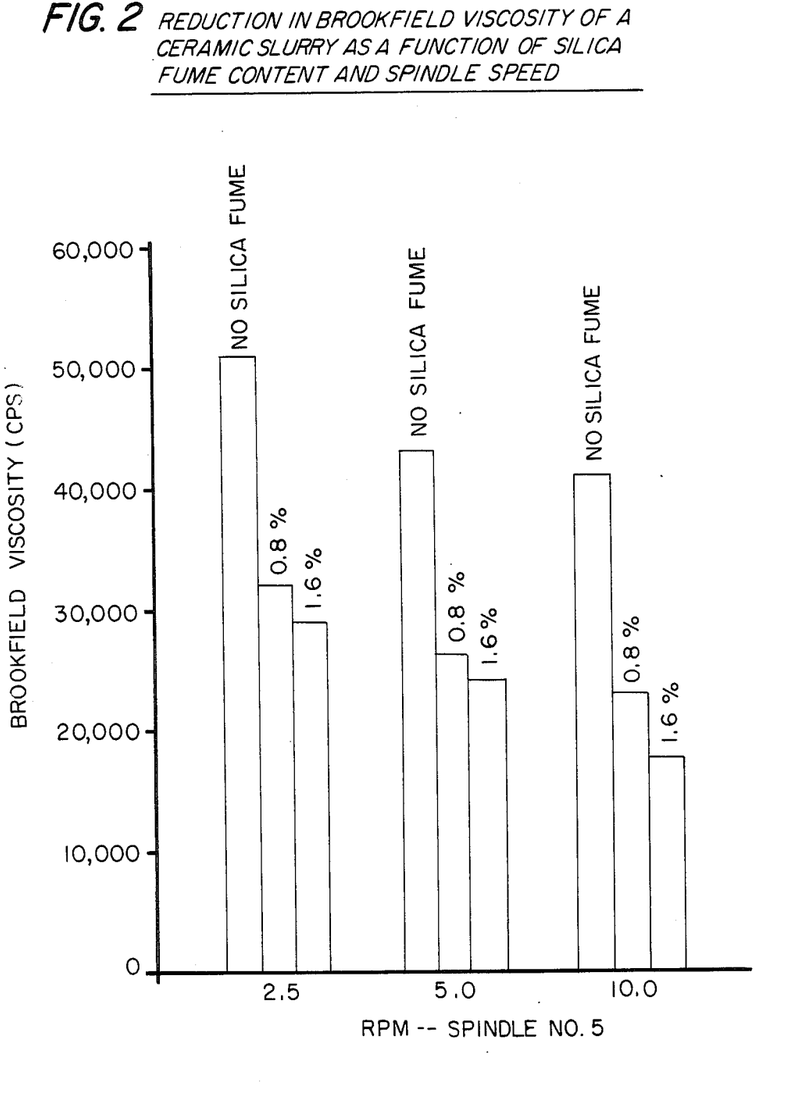
FIG. 2 is a graphical depiction of the effect of a particular gel strengthening agent, silica fume, on the viscosity of the castable composition.
Figure 3:
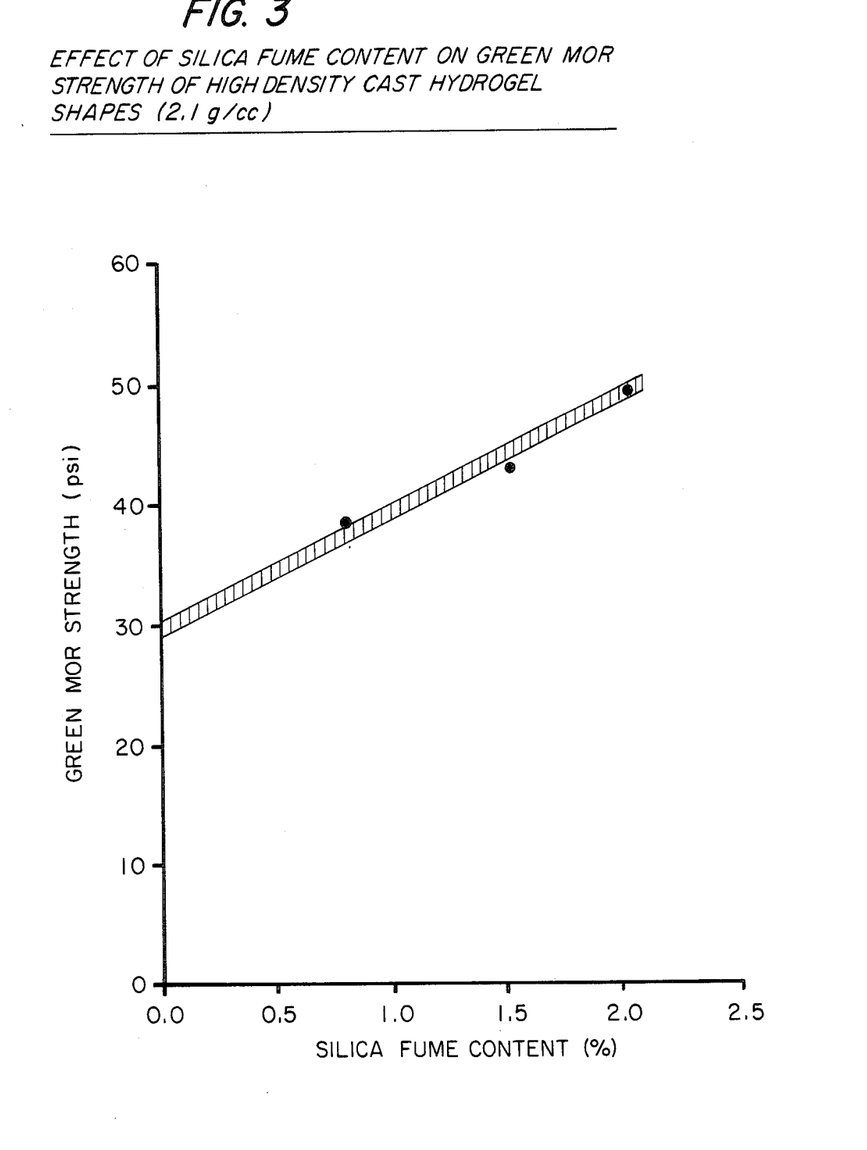
FIG. 3 is a graphical depiction of the effect of silica fume content on the green modulus of rupture (MOR) strength of porous shapes cast according to the invention.

The effect of particular composirional aspects upon certain product characteristics is graphically depicted in FIGS. 2 through 5. Thus, as shown in FIG. 2, the presence of silica fume in the composition results in substantial reduction of the viscosity of the composition, the measured reduction being greater at higher spindle speeds on the measuring device and also greater with increasing amount of silica fume. As shown in FIG. 3, the green strength (as measured by the modulus of rupture or MOR) of the molded shapes increases, generally linearly within the region shown, with increasing silica fume content.

Figure 4:
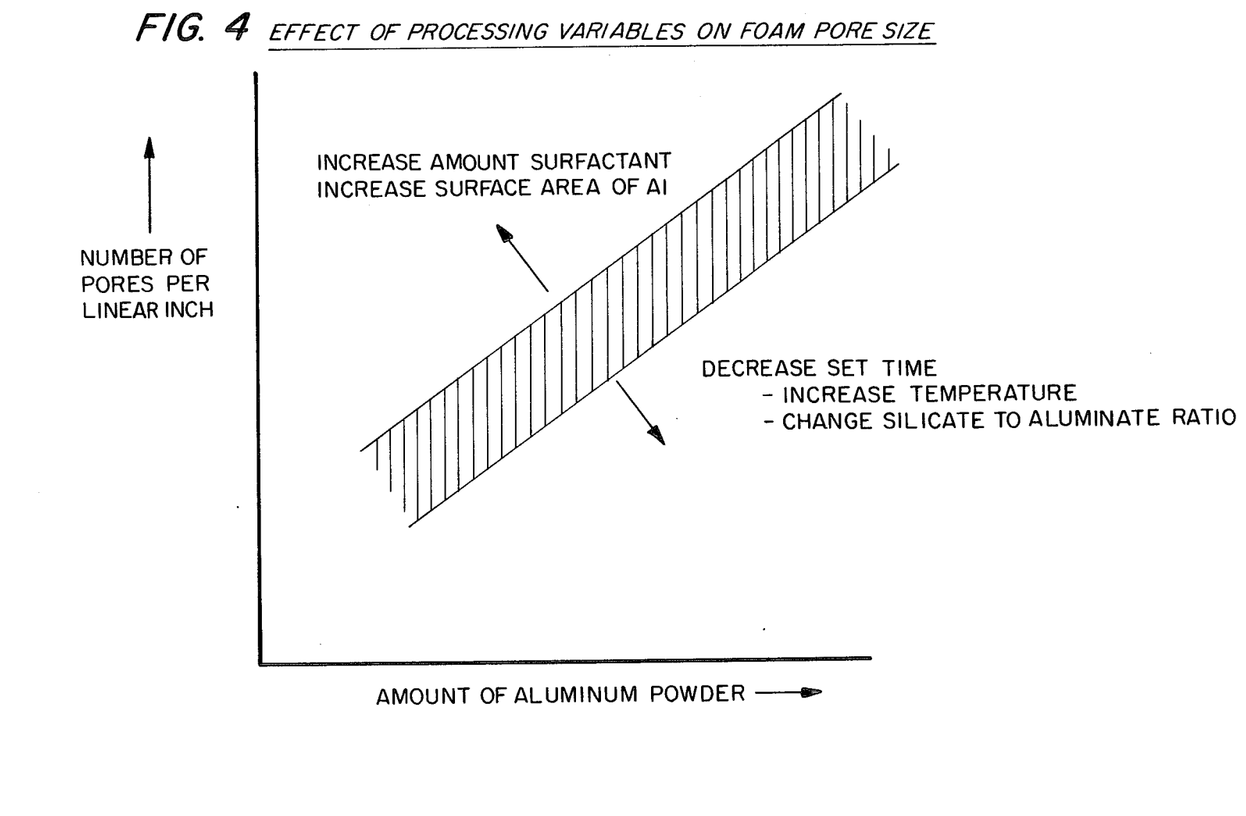
FIG. 4 is a graphical depiction of the effect of aluminum metal content on the pore size of shapes made according to the present invention.
Figure 5:
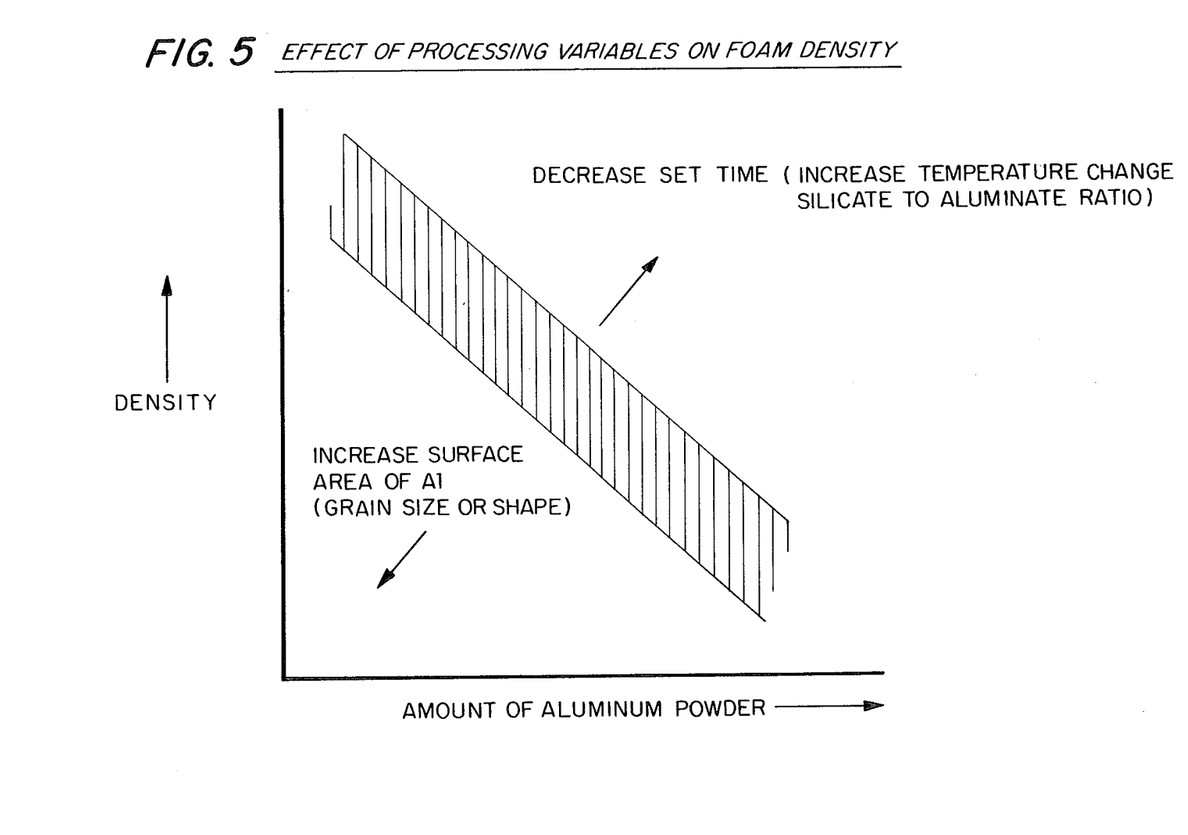
FIG. 5 is a graphical depiction of the effect of aluminum metal content on the density of porous shapes made according to the invention.

FIGS. 4 and 5 graphically depict the interrelationship among the amount of aluminum powder and amount of surfactant upon the pore size and density of the porous shapes. Thus, increase in the amount of surfactant or increase in available surface area of aluminum (increase in amount or also, e.g., by using either a flaked aluminum or smaller grain size) increases the number of pores per linear inch in the molded product. As shown in FIG. 5, increase in slurry temperature or other means to decrease set time results in an increase in density of the molded product, while a decrease in the available surface area of aluminum powder also increases the density.

Particularly for those end uses where elevated temperature and/or wide-ranging temperature cycling will be encountered (e.g., diesel exhaust filters, kiln furniture, furnace linings), it generally is necessary to treat the porous molded article to substantially remove or eliminate alkali or other fluxing and/or glass-forming ingredients therefrom or therein in order to increase the refractoriness of the eventual porous ceramic article. Typically this will be achieved by means of a leaching and/or ion-exchange treatment, and preferably is accomplished by a first water leach followed by ion exchange.

Following any removal of alkali or other fluxing or glass-forming ingredients, the molded article is dried to remove any water therefrom and is then fired in any suitable furnace at the temperatures required (e.g., 2200° F. to 2600° F.) to form the shaped porous ceramic article. Depending upon the composition of the moldable ceramic composition and the processing conditions, sintered ceramic refractory articles can be prepared having a broad range of porosity, surface area and the like.

A wide range of refractory foam compositions can be achieved using the basic procedures outlined above depending on the specific requirements of the end product. For example, if thermal shock resistance is of paramount importance, refractory compositions that result in low thermal expansion oan be incorporated such as those containing lithium aluminosilicate, cordierite (a magnesium aluminosilicate) and/or aluminum titanate. In addition, if strength and toughness are more important, then such materials as mullite, zirconia-toughened ceramics and ceramic composites may be incorporated. If high conductivity is important, then the use of silicon carbide or silicon nitride is recommended. If high refractoriness is important, pure alumina can be used. If long term durability is required in both thermal and mechanical shock conditions, then low expansion, strong and tough type systems will be utilized.

To further describe these aspects of the present invention, a number of examples are presented in the following section illustrating variety of potential compositions, processing techniques and the like. In accumulating the data set forth in the examples, density, three-point modulus of rupture (MOR) and the coefficient of thermal expansion were measured by standard ASTM techniques. The pore structure (number of complete pore cells per linear inch) was measured using both Scanning Electron Microscope (SEM) and stereographic light microscope photographs. The predominant microstructural phases were determined using X-ray diffraction techniques as well as light microscope observation of polished and etched surfaces. The relative permeability was obtained using a turbine type air blower and recording the backpressure associated with the open celled structure as 100 scfm (standard cubic feet per minute) of air was forced through. Thermal shock resistance was interpreted as the percent of initial MOR strength the ceramic foam retained after exposing the material to 100 thermal cycles between room temperature and 1250° F.

EXAMPLE 1

A particularly effective ceramic foam filter for high temperature filtering applications was prepared using fused cordierite and calcined kyanite (mullite) refractories in the following manner. Initially, two slurries were prepared, one containing sodium silicate and the other, sodium aluminate. The slurries were prepared to a specific gravity of 2.1 g/cc at a viscosity of 25,000 cps at 70° F.

| Sodium Silicate Slurry | |
|---|---|
| sodium silicate grade 50 (44.1% solids) | 27.2% |
| additional process water | 5.4% |
| Dow surfactant 190 | 0.6% |
| silica fume (¼ micron) | 1.6% |
| chopped fibers (⅛ and down) | 2.0% |
| fused cordierite (−200 mesh) | 30.2% |
| calcined kyanite (−200 mesh) | 32.7% |
| powdered aluminum metal (6–9 micron) | 0.3% |

| Sodium Aluminate Slurry | |
|---|---|
| sodium meta-aluminate solution (46% solids) | 25.9% |
| additional water | 5.7% |
| Dow surfactant 190 | 0.6% |
| silica fume (¼ micron) | 1.5% |
| chopped fibers (⅛ and down) | 1.9% |
| fused cordierite (−200 mesh) | 33.9% |
| calcined kyanite (−200 mesh) | 31.0% |

Using a high shear type mixer or blender apparatus, equal weights (360 g) of the above slurries were combined and cast into a mold cavity with an 840 cc capacity to produce a 10-inch diameter, plate-like configuration, ⅜ inches thick. Since the slurries had a specific gravity of 2.1 g/cc, only 41% of the mold cavity was filled. In approximately 30 seconds after the two slurries were combined at 70° F., the mix began to foam with a predominantly open-celled structure thereby filling the mold to yield a 0.86 g/cc wet density. Foaming stopped when the sodium aluminosilicate hydrogel binder phase "set" (approximately 3–4 minutes), freezing the expanded structure in place. The hydrogel bond developed sufficient strength in 8–10 minutes to allow the cast part to be demolded.

At this point the part contained 4.6% sodium oxide and 20.1% water at the above mentioned 0.86 g/cc density. In order to increase the refractoriness, the sodium oxide was then removed by means of a water rinse followed by subjecting the article to ion exchange with an ammonium chloride aqueous solution. An additional water rinse was then performed, after which the part was removed and allowed to drain and dry.

After the initial draining and air drying period, the part was heated in a vented oven to 400°–600° F. to further dehydrate it. The length of time the part is in the oven varies with the particular type of oven (conventional or microwave) and the specific amount of water in the part as well as the porosity of the part. In this particular example, the 10 inch plate was heated to 600° F. in 6 hours. The warm part was removed from the oven and placed directly in a kiln supported on suitable kiln furniture. The part was then slowly heated to the required firing temperature of 2425° F. in 10–12 hours. Once at temperature, the part was held for 2 hours to complete the sintering operation before being allowed to furnace cool.

Using the above formulation and process, the 10 inch ceramic foamed plate was characterized as follows:

| | |
|---|---|
| Density | 0.63 g/cc |
| Sodium content | less than 0.5% |
| Permeability (in a ten-inch plate) | 4 inches of water back-pressure at 100 scfm |
| Predominant microstructure | cordierite, mullite |
| Coefficient of expansion | $1.5 \times 10^{-6}$ to 700° C. |
| | $3.2 \times 10^{-6}$ to 1000° C. |
| Modulus of rupture | 400–450 psi |
| Modulus of rupture after 100 cycles from RT to 1250° F. | 380–410 psi |
| Pore structure | 30 pores per linear inch |
| Apparent refractoriness | 2500° F. |

A series of 10 inch reticulated foamed plates produced in this manner were placed in the exhaust stream from a 1982, 6.2 liter diesel engine to determine their effectiveness in filtering diesel particulates produced. The plates were arranged in a "stacked element" design. While the exact collection efficiency was not determined, a considerable amount of particulates were trapped within the cross-sectional area of the plates. Once filled with particulates, the plates were regenerated by placing them in a furnace and heating to the soot ignition temperature of 960° F. at which time the plate increased in temperature over that of the surrounding furnace environment indicating an exothermic reaction or burning of the particulates was taking place.

After regeneration, the plates were subjected to the same air flow permeability test to determine how much of the particulates or soot had been removed. Since the same 4 inches of water backpressure was reached, it was assumed that all particulates were burned.

The plates were put back in the exhaust stream to collect more particulates, but this time regeneration was performed using a diesel fuel burner/blower arrangement that was able to heat the ceramic plates in 3–4 minutes to 1400° F. thereby setting up a more thermal shock prone regeneration cycle that was more in tune with the expected service environment. Again, the regenerated plates experienced the same backpressure resistance as new plates. After a number of such regeneration cycles were performed, the plates were sectioned into MOR test bars and broken to determine if any loss in strength occurred as the result of such thermal cycling. No significant loss in strength was recorded.

EXAMPLE 2

An essentially all cordierite type ceramic foam was produced in a similar manner to that in Example 1 with fused cordierite aggregate being the primary aggregate in each of the two reactive slurries, i.e., silicate and aluminate slurries, as follows:

| Silicate Slurry | |
|---|---|
| sodium silicate grade 50 | 27.1 |
| additional water | 6.0 |
| Dow 190 surfactant | 0.6 |
| silica fume | 3.6 |
| fused cordierite (−200 mesh) | 60.8 |
| powdered aluminum metal (6–9 microns) | 0.1 |
| chopped fibers | 1.8 |

| Aluminate Slurry | |
|---|---|
| sodium meta aluminate solution | 24.7 |
| additional water | 6.9 |
| Dow 190 surfactant | 0.6 |
| silica fume | 3.2 |
| fused cordierite (−200 mesh) | 62.8 |
| chopped fibers | 1.8 |

The above slurries were blended together as in Example 1 with the same volume expansion due to the foaming action of the aluminum metal and sodium hydroxide portion of the binder. Rinsing, ion-exchange and drying were also performed as they were in Example 1. Firing however, was slightly lower with an upper holding temperature of 2000° F.

The above formulation and procedures resulted in a reticulated ceramic foam with the following properties and characteristics:

| Density | 0.8 g/cc |
|---|---|
| Pores per linear inch | ~30 |
| Coefficient of thermal expansion | $1.8 \times 10^{-6}$ in/in °C. |
| MOR | 827 psi |
| MOR after 100 thermal cycles (to 1250° F.) | 777 psi |
| Permeability (backpressure at 100 scfm) | 40 inches H$_2$O |
| Principal microstructural constituent | Cordierite |

EXAMPLE 3

The same mix and procedures of Example 2 above were prepared with the exception that the final firing temperature was reduce to 1800° F. The purpose in firing to a lower temperature was to increase the permeability (lowering the backpressure at the 100 scfm flow rate) of the final foamed ceramic. Using the lower firing temperature resulted in the following properties and characteristics:

| Density | .74 g/cc |
|---|---|
| Pores per linear inch | ~30 |
| Coefficient of thermal expansion | $1.8 \times 10^{-6}$ in/in °C. |
| MOR | 505 psi |
| MOR after 100 thermal cycles (at 1250° F.) | 469 psi |
| Permeability (backpressure at 100 scfm) | 18 inches of water |
| Principal microstructural constituent | Cordierite |

EXAMPLE 4

An essentially all calcined kyanite mix was also produced in a similar manner of mixing, leaching/rinsing ion exchange and drying as that set forth in the above examples using the following slurry formulations:

| Silicate Slurry | |
|---|---|
| sodium silicate grade 50 | 26.0 |
| additional water | 5.8 |
| Dow 190 surfactant | 0.6 |
| silica fume | 3.3 |
| calcined kyanite (−200 mesh) | 62.5 |
| powdered aluminum metal (6-9 microns) | 0.1 |
| chopped fibers | 1.7 |

| Aluminate Slurry | |
|---|---|
| sodium meta aluminate solution | 23.7 |
| additional water | 6.6 |
| Dow 190 surfactant | 0.6 |
| silica fume | 3.0 |
| calcined kyanite (−200 mesh) | 64.5 |
| chopped fibers | 1.6 |

Once properly dried, the calcined kyanite foamed plates were fired at 2600° F. with the following properties and characteristics obtained:

| Density | 0.7 g/cc |
|---|---|
| Pores per linear inch | ~30 |
| Coefficient of thermal expansion | $4 \times 10^{-6}$ in/in °C. |
| MOR | 451 |
| MOR after 100 thermal cycles (to 1250° F.) | Failed after 6 cycles |
| Permeability (backpressure at 100 scfm) | 12 inches of water |
| Principal microstructural constituent | Mullite |

EXAMPLE 5

A ceramic foam composition containing dispersed zirconium oxide as a toughening aid was also prepared using the sodium aluminosilicate hydrogel system and a fused zirconia-mullite aggregate using the following starting slurry formulations:

| Silicate Slurry | |
|---|---|
| sodium silicate grade 50 | 21.9 |
| additional water | 4.9 |
| Dow 190 surfactant | 0.5 |
| silica fume | 2.8 |
| fused zirconia-mullite (−200 mesh) | 68.4 |
| powdered aluminum metal (6-9 microns) | 0.1 |
| chopped fibers | 1.4 |

| Aluminate Slurry | |
|---|---|
| sodium meta aluminate solution | 19.9 |
| additional water | 5.5 |
| Dow 190 surfactant | 0.5 |
| silica fume | 2.5 |
| fused zirconia-mullite kyanite (−200 mesh) | 70.2 |
| chopped fibers | 1.4 |

Once properly dried, the foamed plates were fired at 2600° F. with the following properties and characteristics obtained:

| Density | .84 g/cc |
|---|---|
| Pores per linear inch | ~30 |
| Coefficient of thermal expansion | $5 \times 10^{-6}$ in/in °C. |
| MOR | 476 psi |
| MOR after 100 thermal cycles (to 1250° F.) | 395 psi |
| Permeability (backpressure at 100 scfm) | 25 inches of water |
| Principal microstructural constituent | mullite/zirconia |

EXAMPLE 6

Another useful ceramic foamed system based on a cordierite-silicon carbide blend was also prepared using the sodium aluminosilicate hyrogel system and the same leaching/rinsing, ion exchange and drying procedures set forth in the above examples. The silicate and aluminate slurries used for this example consisted of the following materials:

| Silicate Slurry | |
|---|---|
| sodium silicate grade 50 | 27.4 |

| Silicate Slurry | |
| --- | --- |
| additional water | 6.2 |
| Dow 190 surfactant | .5 |
| silica fume | 2.8 |
| fused cordierite (−200 mesh) | 34.0 |
| silicon carbide (−200 mesh) | 27.4 |
| powdered aluminum metal (6-9 microns) | 0.1 |
| chopped fibers | 1.6 |

| Aluminate Slurry | |
| --- | --- |
| sodium meta aluminate solution | 23.6 |
| additional water | 6.8 |
| Dow 190 surfactant | 0.5 |
| silica fume | 2.4 |
| fused cordierite (−200 mesh) | 65.1 |
| chopped fibers | 1.5 |

Once properly dried, the foamed plates were fired at 2200° F. with the following properties and characteristics obtained:

| | |
| --- | --- |
| Density | .75 g/cc |
| Pores per linear inch | ~30 |
| Coefficient of thermal expansion | $2.5 \times 10^{-6}$ in/in °C. |
| MOR | 380 psi |
| MOR after 100 thermal cycles (to 1250° F.) | 335 psi |
| Permeability (backpressure at 100 scfm) | 22 inches of water |
| Principal microstructural constituent | Cordierite, SiC |

EXAMPLE 7

The examples so far have been concerned with the formation of porous ceramic components with high permeability for use in filtration and other similar applications requiring such permeability. One of the other major advantages of the present invention is the ability to change the pore morphology so that a mostly closed versus a mostly open cell structure results. Low density foams with mostly closed cell structures make, e.g., ideal insulation components with their refractoriness limited primarily by the refractory constituents of the final foamed product. In order to create such a ceramic foam, the same sodium aluminosilicate hydrogel bonding system was used but with a different type of surfactant that stabilized a closed versus open cell structure. Since some permeability still occurs in the green or hydrogel state, the same leaching/rinsing, ion exchange and drying procedures used in the preceding examples was used to remove the sodium and make the final foamed product more refractory. The silicate and aluminate slurries used for one such example involving a calcined kyanite refractory consisted of the following compositions:

| Silicate Slurry | |
| --- | --- |
| sodium silicate grade 50 | 26.0 |
| additional water | 5.8 |
| Dow 193 surfactant | 0.6 |
| silica fume | 3.3 |
| calcined kyanite (−200 mesh) | 64.2 |
| powdered aluminum metal (6-9 microns) | 0.1 |

| Aluminate Slurry | |
| --- | --- |
| sodium meta aluminate solution | 23.7 |
| additional water | 6.6 |
| Dow 193 surfactant | .5 |
| silica fume | 3.0 |
| calcined kyanite (−200 mesh) | 66.2 |

Once properly dried, the calcined kyanite foamed plates were fired at 2600° F. with the following properties and characteristics obtained:

| | |
| --- | --- |
| Density | .8 g/cc |
| Pores per linear inch | ~35 |
| Coefficient of thermal expansion | $4 \times 10^{-6}$ in/in °C. |
| MOR | 650 psi |
| MOR after 100 thermal cycles (to 1250° F.) | N/A |
| Permeability (backpressure at 100 scfm) | High |
| Principal microstructural constituent | Mullite |

According to the present invention, then, there is provided a moldable ceramic composition which can be poured or injection-molded or extruded into a desired shape and, in that shape, self-set to a self-supporting structure having controlled open- or closed-cell porosity by virtue of in situ reaction and interaction between and among components of the composition. The structure, with or without intermediate steps to remove undesired alkali or other fluxing or glass-forming ingredients therefrom, is then fired to provide the final porous ceramic shape for use as a filter element, insulation, mold, kiln furniture, furnace lining or other suitable use where strong, low-density articles are required or expedient.

Having described the invention with reference to particular compositions, processes, examples and embodiments, it is to be understood that these particulars are presented for purposes of illustration and description, and are not otherwise intended as strict limitations upon the scope of the fundamental invention as defined in the appended claims.

What is claimed is:

1. A foamable ceramic composition which can be molded to a desired geometric configuration and which is self-settable in said configuration to achieve a self-supporting molded structure of defined porosity, which structure may then be fired to produce a porous shaped ceramic article, said composition comprising an aqueous admixture of effective amounts of an alkali silicate, an alkali aluminate, refractory ceramic materials, from about 0.25 to about 10% by weight of a gel strengthening agent consisting of finely-divided spherical particles of fumed metal oxides, surfactant and metal powder, whereby said alkali silicate and said alkali aluminate react to form a self-setting aluminosilicate hydrogel which serves as a binder to set the composition in the molded shape, and wherein said metal powder is present in an amount effective to react with alkali materials in said composition so as to produce, as a by-product of such reaction, hydrogen gas which, in conjunction with said surfactant, develops in said composition a significant degree of porosity prior to the setting of said hydrogel.

2. The foamable ceramic composition according to claim 1 wherein said gel strengthening agent is selected from the group consisting of silica fume, fly ash, manganese oxide fume, ferro-silicon fume, and mixtures thereof.

3. The foamable ceramic composition according to claim 2 wherein said gel strengthening agent consists of silica fume, and said metal powder is aluminum metal powder.

4. The foamable ceramic composition according to claim 1 wherein said metal powder is present in an amount of from about 0.05 to about 0.5 percent by weight of said composition.

5. The foamable ceramic composition according to claim 1 wherein said surfactant is present in an amount of from about 0.05 to about 1.0 percent by weight of said composition.

6. The foamable ceramic composition according to claim 1 wherein the weight ratio of surfactant to metal powder is in the range of from about 2:1 to about 8:1.

7. The formable ceramic composition according to claim 1 wherein said refractory ceramic materials are present in an amount of from about 50 to about 90 percent by weight of said composition.

8. The foamable ceramic casting composition according to claim 1 wherein said refractory ceramic materials are selected from the group consisting of cordierite, calcined kyanite and mixtures thereof.

9. The foamable ceramic composition according to claim 1 wherein said porosity is predominantly open-celled porosity.

10. The foamable ceramic composition according to claim 1 wherein said porosity is predominantly closed-celled porosity.

11. The foamable ceramic composition according to claim 1 wherein said alkali silicate and said alkali aluminate consist of sodium silicate and sodium aluminate.

12. A foamable ceramic composition which can be molded into a desired geometric configuration and which is self-settable in said configuration to achieve a self-supporting molded structure of defined porosity, which structure may then be fired to produce a porous shaped ceramic article, said composition comprising an aqueous admixture of sodium silicate, sodium aluminate, from about 50 to 90 percent by weight refractory ceramic materials, from about 0.25 to about 10 percent by weight silica fume, from about 0.05 to about 0.5 percent aluminum powder and from about 0.05 to about 1.0 percent by weight of silicone glycol surfactant, whereby said sodium silicate and said sodium aluminate react to form a self-setting aluminosilicate hydrogel which serves as a binder to set the composition in the molded shape, and wherein said aluminum powder reacts with excess sodium in the composition so as to produce, as a by-product of such reaction, hydrogen gas which, in conjunction with said surfactant, develops in said composition a significant degree of porosity prior to the setting of said hydrogel.

13. A process for preparing porous ceramic articles, comprising the steps of:
 (a) providing a foamable ceramic composition comprised of an aqueous admixture of effective amounts of an alkali silicate, an alkali aluminate, refractory ceramic materials, from about 0.25 to about 10% by weight of a gel strengthening agent consisting of finely-divided spherical particles of fumed metal oxides, surfactant and metal powder;
 (b) forming said composition into a desired configuration utilizing a mold or extrusion chamber;
 (c) permitting said composition to reside in said mold or said chamber for a predetermined period of time during which components of said composition react to form an aluminosilicate hydrogel which binds all components of said composition in a supportable shape conforming to said mold or chamber and during which porosity is developed in said supportable shape by virtue of evolution of hydrogen in said composition as a result of reaction between said metal powder and alkali materials in said composition;
 (d) removing said supportable shape from said mold or said chamber; and
 (e) firing said supportable shape to produce a porous eramic article.

14. The process according to claim 13 further comprising the step of treating the supportable shape of step (d), prior to the firing of step (e), to eliminate therein and therefrom substantially all fluxing and glass-forming ingredients so as to increase the refractoriness of the porous ceramic article.

15. The process according to claim 13 wherein said gel strengthening agent is silica fume and wherein said metal powder is aluminum powder.

16. A porous ceramic article manufactured according to the process of claim 13.

17. A porous refractory ceramic article manufactured according to the process of claim 14.

18. A porous ceramic article manufactured according to the process of claim 15.

* * * * *